United States Patent [19]

Whitby et al.

[11] 3,988,719

[45] Oct. 26, 1976

[54] MICROPROGRAMMED DATA PROCESSING SYSTEMS

[75] Inventors: Anthony Maurice Whitby; John Martin Harper, both of Hitchin; Brian John Procter, Welwyn, all of England

[73] Assignee: International Computers Limited, Stevenage, United Kingdom

[22] Filed: Apr. 8, 1974

[21] Appl. No.: 459,187

[30] Foreign Application Priority Data

Apr. 13, 1973 United Kingdom............... 17864/73

[52] U.S. Cl. ............................................ 340/172.5
[51] Int. Cl.² ........................................ G06F 9/18
[58] Field of Search...................... 340/172.5; 445/1

[56] References Cited
UNITED STATES PATENTS

3,286,239  11/1966  Thompson et al............... 340/172.5
3,599,162  10/1971  Byrns et al...................... 340/172.5
R28,221    11/1974  Benghiat......................... 340/172.5

Primary Examiner—Harvey E. Springborn
Attorney, Agent, or Firm—George R. Douglas, Jr.; Anthony D. Cennamo

[57] ABSTRACT

A data processing system is described in which a plurality of microprogram address registers are provided, some of the registers being associated with operations involving a processor and others of the registers being associated with peripheral devices. Each register corresponds to a different level of microprogram interrupt and the registers associated with processor operations correspond to levels lower than the levels associated with the peripheral devices.

3 Claims, 4 Drawing Figures

MICROPROGRAMMED DATA PROCESSING SYSTEMS

BACKGROUND TO THE INVENTION

The invention relates to microprogrammed data processing systems, and particularly to a processor suitable for servicing a plurality of peripheral machines on a preassigned priority basis.

The capacity required of buffering facilities for at least the fastest of the peripheral machines associated with a processing system can be reduced by assigning priorities to the peripheral machines and allowing higher priority machines to interrupt lower priority ones. The facility for handling interrupts may require the processing of microprogram routines of varying complexity and will generally take up considerable processor time, especially for dumping and recovering microcode and data for the interrupt machine, leaving a still significant buffering requirement.

An object of the present invention is to provide a data processing system with an improved facility for handling peripheral interrupts. This is achieved by providing a number of microprogram levels, each level having its own microprogram address register so that changes in microprogram level can be made without the necessity for dumping and undumping the contents of the address registers. Different peripherals are allocated different microprogram levels, so that they can readily interrupt each other. (Additionally, some peripherals may share the same level, but these peripherals will not be able to interrupt each other without dumping the address register).

A processor embodying the invention will generally have its highest priority microprogram level reserved for critical interrupts, e.g. from parity failures or hardware malfunctions. The normal interrupt hierarchy for microprogram levels will thus start with the critical interrupt level and be followed by the peripheral machine related levels with processor-related activity lower still in the hierarchy.

As indicated above, processor activity unrelated to peripheral machine requirements is given the lowest priority and this is interrupted by any peripheral machine request for service. Rather than allocate only one microprogram level to such processor related activity, it is preferred to use a number of levels also arranged hierarchically with each level having its own microprogram address register.

Such provision of a number of processor related microprogram levels with the appropriate registers is preferably associated with a reversible counter for level change control and allows a stacking feature in which nesting of microprogram jumps is managed by incrementing the contents of the microprogram address register for the current level prior to operating the counter to select the next higher priority microprogram level address register for receiving the jump destination. On successful return from a jump, the counter is sequenced to the next lower priority microprogram level.

A convenient total number of microprogram levels is sixteen with eight allocated to processor activity unrelated to peripheral machines, seven higher levels allocated to peripheral related processor activity, and the highest level reserved for critical interrupts. This means that the microprogram address registers will be replicated to a depth of sixteen as will some of the working registers, the remainder of which being held nine deep.

It is preferred for each set of registers to be embodied as a random access word organised memory and for all such memories to be addressable by an indication of the desired microprogram level which will be determined in part by a priority network for assessing the priorities of peripheral machines that request processor time. As has been indicated above such a priority network may be backed by a further one that is effective to select between peripheral machines that share the same microprogram level.

In a preferred embodiment, applications of the level determining indication to the various sets of memories constituting replicated registers is not done simultaneously as the processor operations are overlapped or pipelined with microinstruction fetching, microinstruction decoding, and consequent data flow control for instruction executive taking place in consecutive processor cycles. This means that at any one time, fetching, decoding and execution relative to different microinstructions may be taking place. Appropriate timing of microprogram level changing and register switching is thus required to allow instructions already being serviced to run on to the execution stage.

Preferably, a nullify facility is provided which is operative during such run-on of the pipeline to count from initiations of jump operations or store accesses, so that returns to the interrupted level can be made to a microprogram address modified to point to an instruction corresponding to the initiation of the jump operation. It is preferred that a minimum number of microinstructions be performed before one peripheral level is substituted by another even if of higher priority.

Preferably, the processor is consolidated with standard peripheral facilities in a unitary design in which versatility is provided by specific purpose-designed couplers for each peripheral concerned. These standard facilities each conveniently include far less hardware logic than a normal free standing peripheral machine and, instead, use the microprogram controlled processor to perform necessary control procedures by requests via the coupler concerned. A preferred normal package of peripheral facilities comprises a disc store, card reader, line printer and a video console. A coupler will also be available for direct data entry for which a microprogram store extension may be required. Furthermore, in view of the flexibility of the microprogram control, couplers are readily provided to simulate standard interfaces for other peripheral machines, said to give complete compatibility, so-called "plug-compatibility" with other ranges of machines.

In a preferred implementation, programs of microinstructions can be viewed as comprising two types both of which use a basic set of functions for the arithmetic unit, one being to handle peripheral input/output and controls and the other of which is concerned with implementating a particular target, program function set, such as that developed for a specific computer or range of computer. Preferably, the microprogram store is writable and this gives inherently greater flexibility to the system, particularly in imitating other "target" systems.

It is advantageous to embody the invention using random access writable storage for the microprogram. This will allow replacement of microprogram directed to one target code by microprogram directed to any other target code. Certain features, particularly loading of microprogram and data storage, will be unaffected by target code and it is preferred to store such microprogram material in random access read only storage which, ideally, uses the same constructional technology hereby giving at least compatible cycle times.

For any particular target code it is feasible to use permanently configured storage, e.g. random access read only memory similar to that mentioned above for store loading. Then there will be different storage units for each target code. It is, of course, equally possible to use so-called "hard-wired logic" to decode target code and such an implementation may well use medium or large scale integrated circuits.

BRIEF DESCRIPTION OF THE DRAWING

One embodiment of the invention will now be described, by way of example, with reference to the drawings, in which.

DESCRIPTION OF THE PREFERRED EMBODIMENT.

Figure 1:
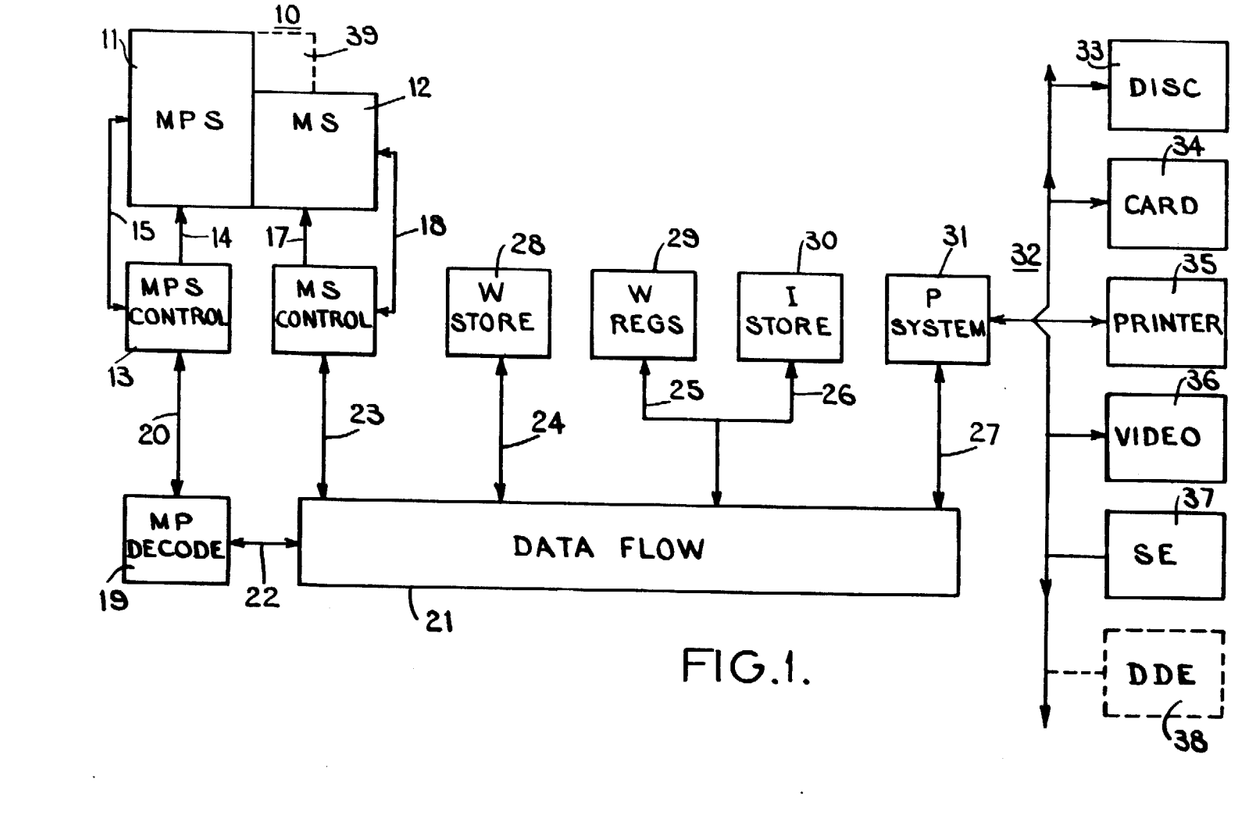
FIG. 1 is a block diagram showing the overall structure of a data processing system embodying this invention.

FIG. 1 shows a store arrangement 10 including parts for microprogram storage 11 and main or data storage 12. The two store parts 11 and 12 are shown as being separately addressed. They are further shown as being different size blocks to represent that they may have different word lengths, as well as different word capacities. Although the two stores parts 11 and 12 are shown as separate units and as being separately addressed, in the preferred embodiment of the invention they are, in fact, provided by a single storage unit, and are both addressed over a common path, as will be described below in relation to FIG. 2. Microprogram store control 13 is shown with a store address path 14 and an instruction path 15 shown as beind bidirectional to allow for writing microprogram material as well as reading it for control purposes. In a similar way, main store control 16 is shown with an address path 17 and bidirectional data communication 18 with the main store 12.

A microprogram instruction decoder 19 is operative on microinstructions fetched from the store 11 by the microprogram store control 13 and supplied via 20. The decoder generates control signals for a main logic and arithmetic unit or data flow mill 21. The decoder 19 also processes microprogram jump control signals for the microprogram store control 13.

Bidirectional communications are shown at 22 and 23 between the mill 21 and both the microinstruction decoder 19 and the main store control 16. Similar communications 24, 25, 26 and 27 are also shown for a working store 28, working registers 29, image store 30, and peripheral control system 31. The working store 28 is a word organised scratch pad with relatively very fast access and is used by the mill in generally conventional manner. The working store preferably has all its addresses available to levels 8 to 15 of processor activity but only a portion, preferably half, available for peripheral related microprogram levels. Typically, reserved locations are provided for marks in both halves of the store. Other locations may be allocated to range-defined registers, translation slaves, constants, peripheral control words and as further masking registers depending on the access requirements of the microprogram. It has been mentioned above that the working store has a very fast access being, typically, a 256 × 32 bit word organised scratch pad allowing up to two read and one write accesses on a single microprogram instruction. The working registers 29 will be described in greater detail in connection with the multilevel microprogramming features. The image store 30 is a plurality of registers and storage capable of being addressed to give the contents of all the other registers in the processor and only some of which can be accessed by the microprogram in the store 11.

The peripheral system 31 services the processor end of a peripherals highway 32 and includes a priority net for determining which of a plurality of peripheral machines has access to the processor at any one time. Priority logic circuits for resolving simultaneous interrupt requests are shown, for example, in U.S. Pat. Nos. 3,491,339 and 3,508,206. Each peripheral machine is connected to the peripheral interfacing highway system 32 by a coupler which serves to pass peripheral control signals generated by microprogram and also input or output information. Specific couplers are provided for a disc store 33, card reader 34 printer 35, video console 36, standard interface 37 and a direct data entry facility 38 as shown at 33 to 38 respectively. Where the direct data entry facility is provided, more storage will be devoted to microprogram material as indicated by the dotted addition 39 to the store part 11.

Figure 2:
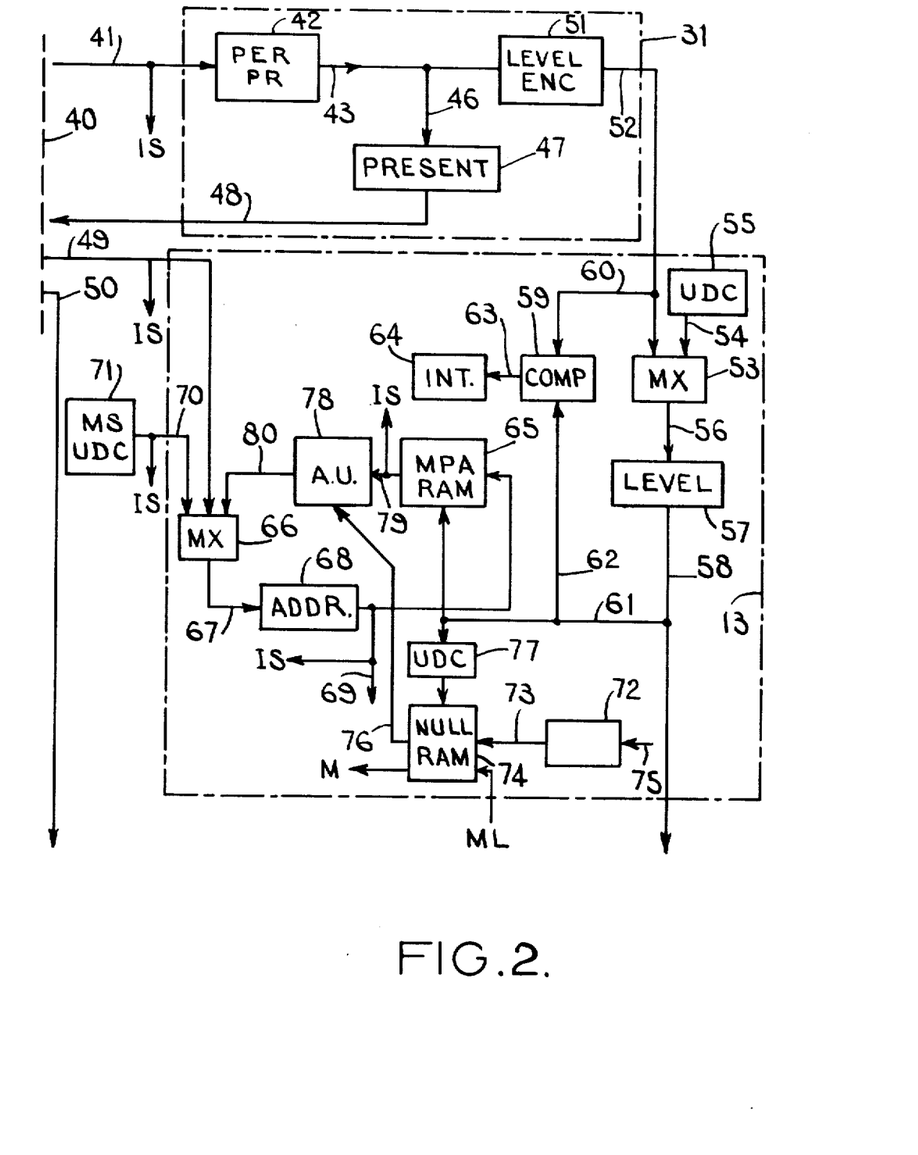
FIG. 2 is a block diagram showing in more detail those parts of the blocks of FIG. 1 that are involved in microprogram store address level changing as a result of a peripheral machine request.

In FIG. 2 a dashed line 40 is used to indicate the interface to the peripheral machine couplers 33 to 37 of FIG. 1, and is generally equivalent to the communications shown at 32 in FIG. 1. A first multiline path 41 from this interface 40 will be energised according to which of the peripheral machines requests a processor access. A priority encoder 42 is responsive to the energisation of path 41 to decide which peripheral machine is given priority among those that are requesting at any time. In general, it will be most convenient for the path 41 to include one line for each peripheral machine coupler but denser coding can be employed as convenient to avoid undue limitation of the number of peripheral couplers served.

The output of the priority encoding network 42, which will identify a particular peripheral coupler, is taken via 43 and represents the highest priority request at any time. The output 43 is taken via 46 to a circuit 47 for sending a present signal via 48 to the peripheral given priority. In response to the present signal on 48, the selected coupler is caused to energise a multiline path 49 with a microprogram store address corresponding to the start of the particular routine of program required to service the particular request. This may concern an information transfer and/or control of a particular operational phase of the peripheral machine.

The path 49 is common to all of the peripheral couplers in the system. Another multiline path 50 common to all couplers is also provided and is also loaded at the same time with information for a modifier register of the processor.

The output 43 of the peripheral priority encoding network 42 is also taken to a further priority encoding network 51 which serves to provide a representation, on its output 52, of a microprogram level appropriate to the selected peripheral machine. Two encoding networks 42 and 51 are shown because of the possibility of two or more peripherals sharing the same microprogram level and the necessity to identify both the selected coupler (over 48) and the corresponding microprogram level (over 52). In physical terms these encoders 42 and 51 could be a single unit with outputs from different stages or parts thereof.

The result of the priority decisions and microprogram level determination for peripheral machine requests is passed via the encoder output 52 to a multiplexor 53. The multiplexor 53 is operative to select between two inputs thereto consisting of the encoder output 52 and output 54 of a reversible counter 55 used in determining micrprogram levels for processor activity unrelated to peripheral requests. A reversible counter is shown, for example, in British Pat. spcification No. 1,339,188. The multiplexor 53 will supply its output 56 to a level identifying register 57 having a multiline output 58.

Priority is given to microprogram levels concerned with peripheral activity so that the multiplexor will be operated to favour input 52 thereto except when no request for peripheral related action exists. Priority is also given between peripheral requests and a microprogram level may interrupt a lower priority level. Seven levels are assigned to peripheral actions and these are represented by binary numers 1 to 7 in descending order of priority, i.e. value 1 has highest priority. Level interrupts due to peripheral requests are handled using a comparator 59 to compare the encoder output 52 (via branch 60) with the output 58 of the level identifying register 57 (via branches 61 and 62). Whenever the encoder output 52 goes to a lower binary value (higher priority) than the level identifying register contents, the comparator 59 produces a predetermined output on line 63. The line 63 is fed to an interrupt permission circuit 64 which is provided to ensure that an interrupt does not interfere with a dedicated control sequence, e.g. a store cycle. It also has the effect of limiting the frequency of interrupts. This circuit 64 will allow a peripheral interrupt only if at least three processor cycles have taken place since the last interrupt. As described later, it also inhibits on interrupt for five cycles after a main store access starts. This control is readily achieved using either a small counter or a shift register.

For a processor cycle at which the microprogram level register 57 changes state, a switch will be made from the current microprogram address register to the appropriate new one. Such microprogram address registers comprise different word locations of a 16-word random access writable store 65 addressed from the level output branch 61. The allowance of this interrupt level change also causes a multiplexor 66 to select the path 49, which constitutes one of its input options, and energise its output 67 accordingly. The multiplexor output 67 supplies a store addressing circuit 68 operative to address the store 10 over path 69 which thus corresponds to the function indicated by arrow 14 of FIG. 1. Another input 70 of the multiplexor 66 comprises the output of a counter 71 selectable for normal sequential addressing the main or data store part 12 of the store 10, so the path 69 also performs the function indicated by arrow 17 of FIG. 1. by overlapping odd and even addressing of the store 10.

Changing the contents of microprogram level identifying register 57 selects a different location in store 65 and so preserves the return microprogram store address in the previously selected location of store 65. The new microprogram address is obtained from path 49 and appears on path 60 so that fetching is initiated from the microprogram store 11 of the first microinstruction of the sequence required by the requesting higher priority peripheral. The path 69 has a branch extending to the input for the store 65 and the new microprogram store address will thus be written into the microprogram address register location selected by the level register output branch 61.

The system operates in an overlapped or pipeline mode in which the fetching, decoding and execution phases of successive microinstructions are performed simultaneously. Pipeline systems are shown, for example, in U.S. Pat. Nos. 3,609,700, 3,717,850 and 3,736,850. Because of this overlapping, whenever a particular microinstruction is interrupted, two previous microinstructions will still be alive in the processor, one in the decode stage (21 of FIG. 1). If either of these micro instructions requires a jump or, as will be described, a main store access, it will be necessary on returning to the interrupted level to go to the microprogram store address that required a jump, i.e. to nullify the corresponding and succeeding instructions. To cope with this nullification, a logic circuit 72 is provided for normally giving an output 73 of value of 2 on each processor cycle except after an interrupt when it will be decremented to 1 and then 0 for the run-on processor cycles unless a jump or store access is initiated when it will be inhibited from changing over by line 75. The output of this logic 72 is input to another 16-word random access writable store 74 of which the writable location is also determined by the level output branch 61 which sets a reversible addressing counter 77 for the store 74. The corresponding location in null store 74 will, after run-on, thus contain a number representing the number of microinstructions that need nullifying on return from the interrupt. An output 76 of the null store 74 supplies an input to an arithmetic unit 78 which is part of the data flow mill 21 of FIG. 1 and serves to subtract the null count on path 76 from the value of an output 79 of the microprogram address register store 65. The corresponding modified store address is made available on path 80 also input to the multiplexor 66. It is this input that is selected by the multiplexor 66 on return to an interrupt microprogram level and it will be the same as the contents of the appropriate location of the address store 65 except where a nullifyoperation is indicated as necessary.

Initiation of a higher priority microprogram level requires a change in the state of the level register 57 and consequent changes in the enabled locations of the register stores 65 and 74 and the address applied to the store via path 69, thereby causing fetching of a microinstruction specified on path 49. On the next processor cycle appropriate decoding is performed (block 19 of FIG. 1) and execution of the last microinstruction of the interrupted level takes place (block 21 of FIG. 1).

It will be appreciated that, in general terms, the pipeline will involve a further overlapped function, namely forming a microprogram store address.

On the second processor cycle following a change in the contents of the microprogram level register 57, execution of the first of the interrupting microinstructions is required. This involves switching between replicated working registers as will now be described with reference to FIG. 3.

Figure 3:
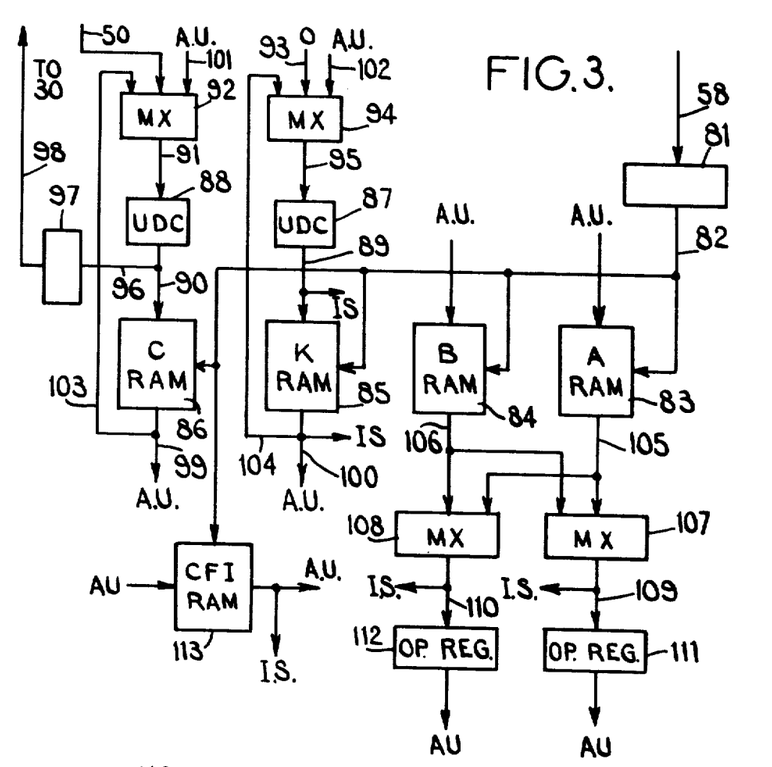
FIG. 3 is a block diagram showing parts of the data flow block of FIG. 1 that are involved in a microprogram level change.

The output 58 of level register 57 is gated into a register 81 at the appropriate time. An output 82 is taken from the register 81 on the second cycle after a microprogram level change and used to change addresses applied to random access writable stores 83, 84, 85 and 86 which constitute replicated working registers A, B, K and C, respectively. The multiple register stores K and C both have sixteen word locations of which one is selected at a time according to the microprogram level indication on path 82. The selected one of each of the banks of registers K and C receives the current contents of a respective one of reversible counters 87 and 88 over paths 89 and 90, respectively. The K registers 85 are used for controlling microprogram loops in corresponding microprogram levels and will be set to zero whenever a level is used for the first time. The C registers 86 are loaded whenever the corresponding microprogram levels are entered and their contents constitute modifiers for addresses of the working store 28 (FIG. 1) whereby each microprogram level and, in particular, each peripheral coupler has access to specified space in the working store which may be, and usually is, different from other couplers. The K registers are set to zero every time a C register is loaded, i.e. on selection of a coupler for the first time. On a peripheral coupler interrupt the appropriate C register is selected two processor cycles after the interrupt is initiated and loaded with the value on path 50 from the coupler subsystem inferface. This is done via path 91 by selection of the corresponding input of multiplexor 92, while, at the same time, an all-zero input 93 is selected for multiplexor 94 so as to reset the K counter 87 via multiplexor output 95.

Use of the C-registers are working store address modifiers allows the same piece of microcode to be executed at different microprogram levels as well as at the same level when it is simply re-entered. It may be started at one level and before execution is complete at that level, one or more higher level interrupts may be completed before returning to complete the original level execution. This facility is useful for driving standard interface couplers.

At the time that the selected C register is loaded on a peripheral coupler microprogram level entry, the modifier being loaded in applied via branch 96 of multiplexor output 90 to a decoder circuit 97 for sending, via path 98 and coupler interface 32, a selection control signal to the originating peripheral coupler which is enabled thereby to put its data in a common data highway input to the processor and to take account of control signals from the processor.

The outputs of the selected C and K registers are available over paths 99 and 100, respectively to the arithmetic unit of the processor for appropriate working store addressing and loop control purposes. Also inputs 101 and 102 to multiplexors 92 and 94, respectively, are shown for outputs of the arithmetic unit so that alterations of the register contents are required by processing can be effected. Feedback paths 103 and 104 are also shown from the register outputs 99 and 100 to other inputs of the multiplexors 92 and 94 for selections as required in loading the counters 88 and 87, respectively.

The A and B registers 83 and 84 are used as sources of operands for the arithmetic unit and for other purposes such as loading the working store, providing a main store addresses, data to be written to store, and loading of the C and K registers. It is also useful for part of each register to be usable as a working store address modifier. They are provided via outputs 105 and 106 for the selected A and B registers connected as selectable inputs of both of multiplexors 107 and 108. Outputs 109 and 110 from these multiplexors 107 and 108 are shown extending to operand registers 111 and 112 for the arithmetic. In practice, the multiplexors will have several other alternatively selectable inputs and their outputs 109 and 110 will be branched and multiplexed to other destinations as required. Such other inputs will include binary all-zero, binary all-one, data from a selected peripheral coupler, and data from the main store, but are not shown on the drawing in order to preserve clarity.

The registers A and B are provided only nine deep there being one for each peripheral activity microprogram level (1 to 7), one reserved for faults (level 0) and one shared by all the processor related microprogram levels (8 to 15). This is becuase the microprogram levels for processor only activity are used for stacking purposes so that, while they will require separated control information for each level, it is only necessary to provide one set of sources of data, i.e. operands, or words for and from store.

The microprogram level selection path 82 also extends to a further word organised random access writable store 113 which has inputs from, and outputs to, the arithmetic unit for information relating to the states of comparison flags and indicators within the arithmetic unit, which are required for control and processing purposes according to the basic instruction set of the processor. The store 113 has one register for each microprogram level, i.e. sixteen.

We have described above how a peripheral coupler corresponding to a higher priority microprogram level can interrupt any lower priority microprogram level activity. We have also described how, in returning to a microprogram level a nullifying modification ensures that jumps or store accesses do not result in any loss of information even if they occur during run-on of that level in the microprogram level transition at interruption. It is possible that during such an interruption a request for service is generated by another peripheral coupler having a microprogram level of lower priority than the interrupting coupler but higher than the interrupt level. This other peripheral coupler should be serviced before returning to the interrupted level. However, whereas a normal return to an interrupted level will simply reselect the appropriate microprogram and working registers, servicing a new request of intermediate priority will require picking up the information concerning microprogram store start address and working store modifier on the paths 49 and 50. Entry to a particular microprogram level is associated with the setting of a corresponding marking bit in an additional register having sixteen bit positions, one for each microprogram level. Conveniently, this is embodied as an additional bit position in each location of the null store 74 which is loaded via line ML on each level change and examined on line M on return from an interrupt. On termination of an interrupt, the request having highest priority microprogram level as shown by the priority determination of block 31 produces a corresponding microprogram level indication. The marker bit corresponding to this level is examined. If it is set the corresponding values of microprogram address, C and K registers etc., are used. If it is not set that indicates entry to that level for the first time and the signals on paths 49 and 50 will be picked up in the same way as for an interrupt.

A further feature of the interrupt facility is that requests for processor access by the couplers are staticised at the couplers by clock pulses from the processor and these clock pulses can be inhibited by the processor at times when an interrupt is not acceptable to the processor. This ensures that peripheral requests are synchronised to the processor timing. Coupler requests will remain set until an EXIT pulse is supplied by the processor together with the select control signal (from 97). This ensures that an interrupt level will not be forgotten before return from the interrupt or interrupts.

The processor being described will service peripheral coupler requests in the appropriate one of microprogram levels 1 to 7. It may also, of course, institute peripheral activity using the corresponding microprogram level. Operation in these levels 1 to 7 is interruptable by a higher ranking level and, folliwng such an interrupt, operation will proceed in the next highest level requiring service which may mean a further delay before returning to the first interrupted level. As has been previously mentioned processor action in microprogram level 0, the highest priority level, is reserved for critical interrupts such as parity faults or hardware failures. When no peripheral action is required or requested, normal data processing takes place in microprogram levels 8 to 15.

Operation in microprogram levels 8 to 15 is rather different from that in levels 0 to 7 in that transitions from level to level are normally sequential in accordance with stack-type control of nesting routines. On a jump to another routine from which a return is expected, the microprogram instruction concerned, called LINK, will, when decoded, cause a count pulse to be applied to the microprogram level reversible counter 55 to provide the next higher priority level which will select corresponding microprogram address and mill count registers for loading with the start address specified by the LINK instruction. On a return from a jump, the microprogram instruction concerned, called EXIT, will, then decoded, cause a reverse count pulse to be applied to the counter 55 to cause selection of the microprogram address register of next lower priority to resume processing at that level. On each transition the pipeline will be allowed to run-on so that corresponding changes to the working registers C and K, and comparison, flags and indicators register 113 will occur two processor cycles after initiation of the transition as outlined above. Clearly, up to eight nested jumps can be accomodated using this system with no requirement for time consuming dumping and undumping. Jump instructions may be simulated by overwriting the microprogram address register of the then current level with a computed address. This involves declaring the microprogram address register as an operand destination, and the instruction will be treated as unconditional with no mulification of the run-on sequence so causing loss of processor cycles.

Figure 4:
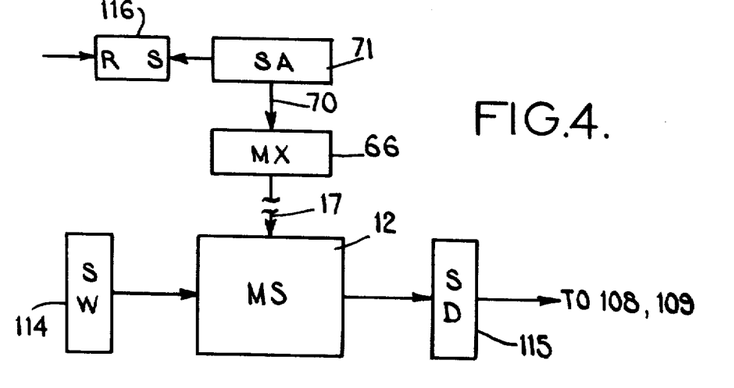
FIG. 4 is a block diagram relative to which main store operations are outlined.

The reason that main store accesses require nullification if they occur during run-on of the pipeline on a level 0 to 7 interrupt is that the main store input and output registers are not replicated for the different microprogram levels, and advantage is taken of the pipelining in organisation of the store control. FIG. 4 shows the basic arrangement of the main store 12 relative to a register 114 for words to be written to store, a register 115 for words read from store, and store addressing path 17 from the output of the multiplexor 66 (see also FIG. 2) when its input 70 from the main store address counter 71 is chosen. To ensure that the contents of the registers 114, 115 and address counter 71 are protected until used by the then current level of microprogram operation, a store busy indication is set which serves to prevent microprogram level changes until it is reset. Such resetting preferably occurs not later than a predetermined number of microinstructions following loading of the store address counter 71 so as to prevent an indefinite inhibition on level change which could result in a crisis for a peripheral machine, e.g. synchronous, virtually unbuffered machines such as discs and card readers. This predetermined number can be achieved automatically by hardware or, alternatively by a microprogram writing convention, and in the present embodiment is five.

On a main store read operation, the store address counter 71 is loaded on one microinstruction which causes the store busy condition to be set, for example by setting a bistable 116 shown adjacent the counter 71. Data read from that address will be indicated as valid in the store output register 115 on the third microinstruction after loading the address counter 71, and the store busy indication is reset as soon as the store output register 115 is used as an operand source. Two read operations may be overlapped if the second read is initiated, by loading the counter 71, on the instruction immediately preceding the one that uses the register 115 as an operand source. Then the second word read to the register 115 must also be used as an operand not later than the fifth instruction after first loading the counter 71.

On a store write operation, the store address counter 71 is loaded and the bistable 116 is set, followed by loading the store write register 114. The bistable 116 will re reset when the store write register 114 is accessed. Two write operations cannot be overlapped but a write operation can overlap a read by loading the counter 71 on the instruction immediately preceding that using the output register 115 as an operand. Then the input register 114 is loaded not later than the fifth instruction after loading the counter 71 for the read operation.

A read-modify-write store operation will also normally be provided and can be completed within the five microinstructions allowed for the store busy condition.

The couplers, for example 33 to 38, are hardware circuits that, by their design in relation to any special purpose microcode sequence that may be required, are able to hide any differences that would otherwise be apparent to an operating order code from which the stored microprogram translates routines of the basic set of instructions actually used to control internal processor operations. This gives great flexibility relative to new peripheral devices or mechanisms as no processor redesign is necessary once an appropriate coupler is available.

The basic microinstruction set includes many conventional orders. For example, 32-bit, two address instructions may provide for arithmetic operations such as add, subtract and negate and logical operations such as move, and or, work-equivalence, while three address instructions may include similar logical functions and extend to and-not, equivalence, and not-and, together with compare then jump, and flag or register bit setting operations. Using 16-bit instructions various register loading, arithmetic and logic operations together with some shift and flag setting operations will generally be provided as main instructions. Auxiliary 16-bit instructions will be available for loading and arithmetic operations on the result of an accompanying main 16-bit instruction and also for various jump operations dependent on the condition of a result relative to flags and indicators or comparators.

Some particularly useful additional microinstruction types will now be mentioned in rather more detail. One of these is related to the preferred byte-oriented organisation of the described processor in which each word has 32 bits divided into four bytes each of eight bits. The type of instuction concerned is basically for taking any one byte of one operand and using it to replace any one byte of another operand. It can be used to transfer particular bytes one at a time and also for constructing words in which one byte is from one source and the other three from another source. In general both sources and destinations can be reversed depending on the particular instruction. For example, if the operands are placed in the A and B registers 83, 84, bytes can be taken selectively from either operand by appropriate selection of the inputs to the multiplexor 107 or 108. The controlled functions, particularly using appropriate modifiers, constitute a useful and flexible byte-handling facility.

Where characters are considered and treated in the manner of bytes, the above mentioned instruction type can clearly be considered as a powerful character management facility. The fact that the byte orientation of the processor can be viewed as character management means that target order codes that are word rather than byte-oriented can be accommodated with advantage.

Data relating to a word-oriented target order code can be readily accommodated by the byte-oriented processor if the word length is the same in both cases. In addition, target code related to word lengths less than the processor word length can also be accommodated using two further types of microinstruction one of which splits the word-oriented form into portions that are less than the byte length for the processor and fills up the spare spaces of the bytes with zeros. Such an instruction is call EXPAND and operates on a shift register to manipulate the bits and add zeros. The other instruction is used after processing to remove the zeros and concatenate the significant bits of the word, such an instruction being called COMPRESS and also being performed relative to a shift register.

For 4-byte 32-bit processor words and 24-bit target code words a suitable EXPAND instruction will be put 24-bit word into position 0 to 23 of a shift register and perform the following shifts to the right: 2 places for bits 0 to 5, 4 places for bits 6 to 11, 6 places for bits 12 to 17, and 8 places for bits 18 to 23. Zeros will be inserted in bit position 0 and 1, 8 and 9, 16 and 17, 24 and 25. The resulting word will be four bytes with zeros in the two most significant bits of each byte.

Another type of instruction is one which allows any designated logical operation between an existing operand, preferably from an address specified in the instruction for the image store or, with or without modification, from the working store, and a specially constructed operand having either a literal 1 or the state of a specified flag inserted in a nominated bit position of an otherwise all-zero 32-bit word. The result may be used to overwrite the existing operand or the nominated flag may be replaced by the result for the nominated bit position. Different fields of the microinstruction will specify the existing operand, the type of logic operation, the nominated bit position, the specified flag if any, and the use to be made of the result. This type of instruction is particularly useful in testing a peripheral machine status, e.g. for operability. This will involve consulting several bit positions of a status word and is conveniently accomplished by successivley selecting different nominated bit positions for selecting logic operations with intermediate results stored at a flag position in accumulative Boolean function.

As well as providing for jumps on comparisons between bytes and words, the instruction set also includes a microinstruction for controlling a jump according to a test on a nominated bit of a specified operand. This is particularly useful for testing the result of a peripheral machine status investigation by the preceding microinstruction type.

Translation from a particular target code function to the basic microprogram function set of the processor is facilitated by a further type of microinstruction which is used for temporarily extracting any field of a specified word. The function is performed by shifting the word concerned by a specified number of bit positions and then selecting a specified number of bits of the word from one end, generally the least significant end, of the shift register. The selected portion or field of the word can then be processed as appropriate to translate to the required microprogram function address. This involves indexing from the base address of a function table in the main store. As well as microprogram routine start addresses this table may include other information relevant to routines to be addressed.

A specific example of one ICL 1900 series function operation will now be given by way of example. The function chosen is a register load (LDX) as will be required for any implementation of that target code and includes the following basic steps; where specific figures are given they are in hexadecimal form:

1. The target code order address is loaded into the store addressing register and the corresponding instruction (target order) is fetched. This will be in the expanded form including zeros inserted to make up four 8-bit bytes.
2. The instruction in the store output register will be compressed to its target code format of 24 consecutive bits by shift register and zero removal operations as mentioned above. The result will be put in register B.
3. A temporary extraction will then be made on the contents of register B to bring the function defining portion of the order to the least significant bit positions and extract them. A right shift of 14 bit places and extraction of 9 least significant bits is concerned. The result is used to index the base address of the function table for making a corresponding working store access.
4. A second temporary extraction on the contents of register B (right shift of 1B places and extract 5 least significant bits) provides the address of the register concerned and this is put to a known working store address.
5. A third temporary extraction in the B register contents (right shift 8 places and take C bits) provides the information relating to what is to be written to the desired register and puts it to another known working store address.

6. Loading of the specified register with the required contents can then take place after various tests have been made, for example, to see if the information to be loaded (step 5) is a literal or a register address, and, if a register address, whether it specifies the register into which the extracted register address was put or whether the two addresses specify the same register.

Other factors that may be involved prior to the execution step 6) above will relate to whether a modifier is specified, for example, from the C or B registers.

On the initial store access, there will be a delay of two processor cycles between steps (1) and 2) above and this will generally be used for testing the validity of the address concerned and this is conveniently an extension of a test begun before the store access 1) is initiated.

The outputs of various registers of the processor are shown in FIGS. 2 and 3 as having an arrowed branch labelled IS to indicate storage of their state in the image store indicated in FIG. 1. In this way, with appropriate gating on these branches, a consultable record is kept of processor activity that is particularly useful for fault diagnosis purposes.

We claim:

1. A data processing system comprising:
   a. a program store;
   b. a plurality of program address registers for holding program addresses relating to respective program levels of operation;
   c. a program level register;
   d. a plurality of peripheral devices associated with respective ones of said program levels;
   e. priority means, responsive to interrupt request signals from the peripheral devices, for selecting the highest priority one of said interrupt request signals and producing an interrupt program level indication representating the program level associated with the peripheral device which originated said highest priority request;
   f. interrupt means for loading said interrupt program level indication into the program level register;
   g. means for utilising the program level indication in the program level register to select one of the address registers for addressing the program store, thereby activating the corresponding program level; and
   h. data path means for receiving a program start address from the one of the peripheral devices which originated the highest priority request, and for writing that start address into the selected one of the address registers to provide a start address for the activated program level.

2. A data processing system according to claim 1 wherein the interrupt means comprises:
   comparator means for comparing a current program level indication held in the program level register with the interrupt program level indication produced by the priority means and producing a predetermined output signal in the event that the current level indication is of higher priority than the interrupt level indication; and means for inhibiting loading of said interrupt level indication into the program level register in the presence of said predetermined output signal.

3. A data processing system comprising:
   a. a program store;
   b. a plurality of program address registers for holding program addresses relating to respective program levels of operation;
   c. a program level register;
   d. a plurality of peripheral devices associated with respective ones of said program levels;
   e. priority means, responsive to interrupt request signals from the peripheral devices, for selecting the highest priority one of said interrupt request signals, and producing an interrupt program level indication representing the program level associated with the peripheral device which orignated said highest priority request;
   f. means for producing a normal program level indication;
   g. multiplexer means for selecting the interrupt program level indication in the presence of an interrupt request, and selecting the normal program level indication in the absence of an interrupt request, and loading the selected program level indication into the program level register; and
   h. means for utilising the program level indication in the program level register to select one of the address registers for addressing the program store, thereby activating the corresponding program level.

* * * * *